(12) United States Patent
Hognaland

(10) Patent No.: US 10,697,688 B2
(45) Date of Patent: Jun. 30, 2020

(54) COOLED STORAGE SYSTEM

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 60 days.

(21) Appl. No.: 15/860,699

(22) Filed: Jan. 3, 2018

(65) Prior Publication Data

US 2018/0128532 A1     May 10, 2018

Related U.S. Application Data

(63) Continuation of application No. 15/118,495, filed as application No. PCT/EP2015/053390 on Feb. 18, 2015, now Pat. No. 10,018,397.

(30) Foreign Application Priority Data

Feb. 19, 2014    (NO) .................................... 20140216

(51) Int. Cl.
| | |
|---|---|
| *F25D 13/04* | (2006.01) |
| *B65G 1/04* | (2006.01) |
| *B65G 1/02* | (2006.01) |
| *F25D 25/04* | (2006.01) |

(52) U.S. Cl.
CPC ............... *F25D 13/04* (2013.01); *B65G 1/02* (2013.01); *B65G 1/0464* (2013.01); *F25D 25/04* (2013.01); *F25D 2201/10* (2013.01)

(58) Field of Classification Search
None
See application file for complete search history.

(56) References Cited

U.S. PATENT DOCUMENTS

| | | | |
|---|---|---|---|
| 2,165,513 A | 7/1939 | Smith | |
| 4,043,463 A | 8/1977 | Hansen | |
| 4,063,432 A * | 12/1977 | Chaussy | ................... A23L 3/36 |
| | | | 62/419 |
| 4,599,871 A * | 7/1986 | Fredrixon | ............... F25D 13/04 |
| | | | 62/378 |
| 6,694,767 B2 | 2/2004 | Junca et al. | |

FOREIGN PATENT DOCUMENTS

| | | |
|---|---|---|
| CN | 101553398 A | 10/2009 |
| CN | 101553416 A | 10/2009 |
| WO | 85/00422 | 1/1985 |
| WO | 98/49075 | 11/1988 |
| WO | WO-2017121512 A1 * | 7/2017 ........... B65G 1/0464 |

* cited by examiner

*Primary Examiner* — Elizabeth J Martin
(74) *Attorney, Agent, or Firm* — Christian D. Abel

(57) ABSTRACT

A cooled storage system comprises a grid structure of storage cells, where each cell is arranged to accommodate a vertical stack of storage bins and having a top level, at least one remotely operated vehicle arranged to move at the top level of the grid structure and receive a bin from a storage cell at the top level of the grid structure, where there is provided thermal insulation between at least a section of the grid structure and the remotely operated vehicle, and said section of the grid structure has a temperature that is lower than the temperature of the remotely operated vehicle.

9 Claims, 5 Drawing Sheets

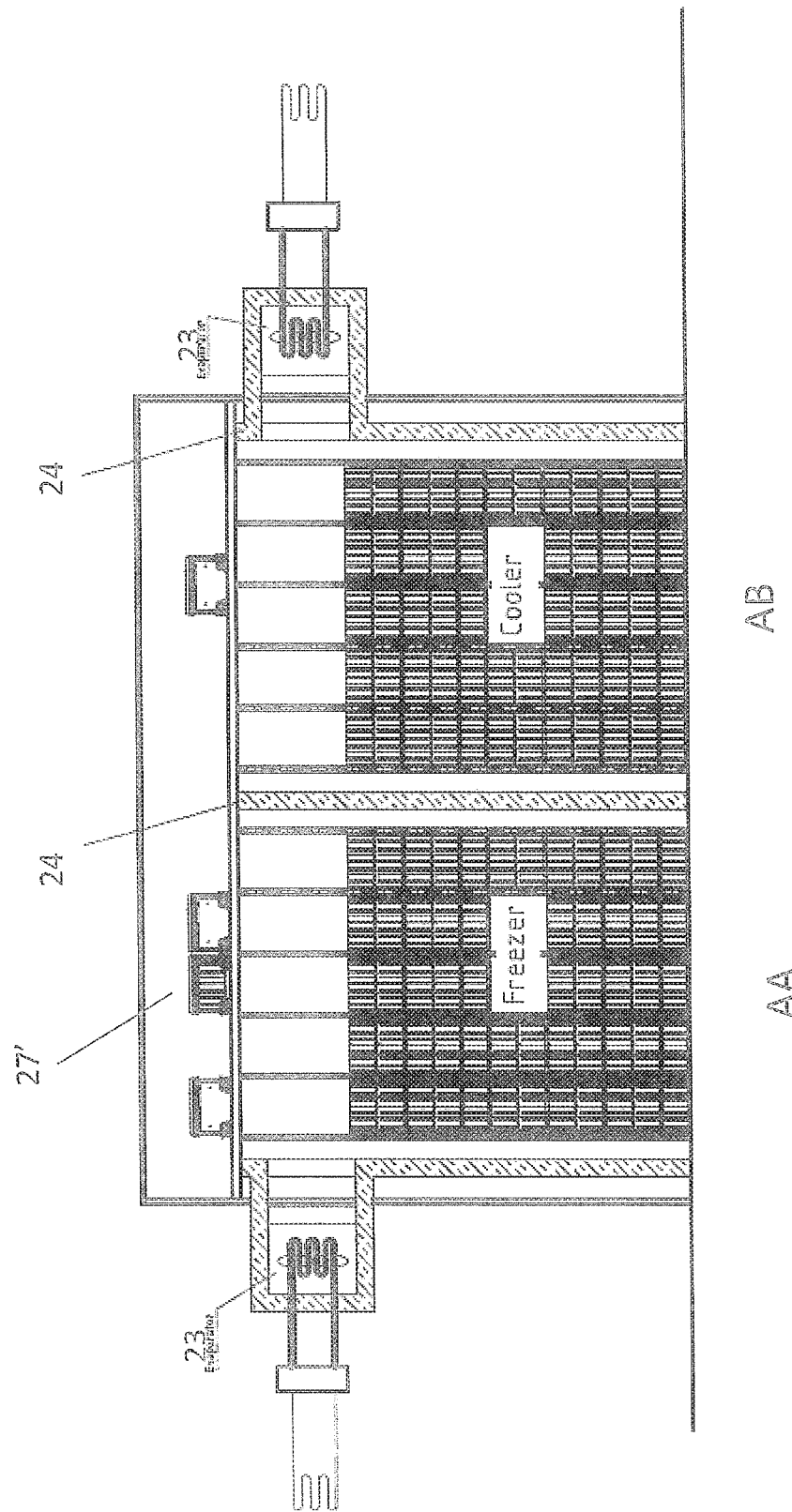

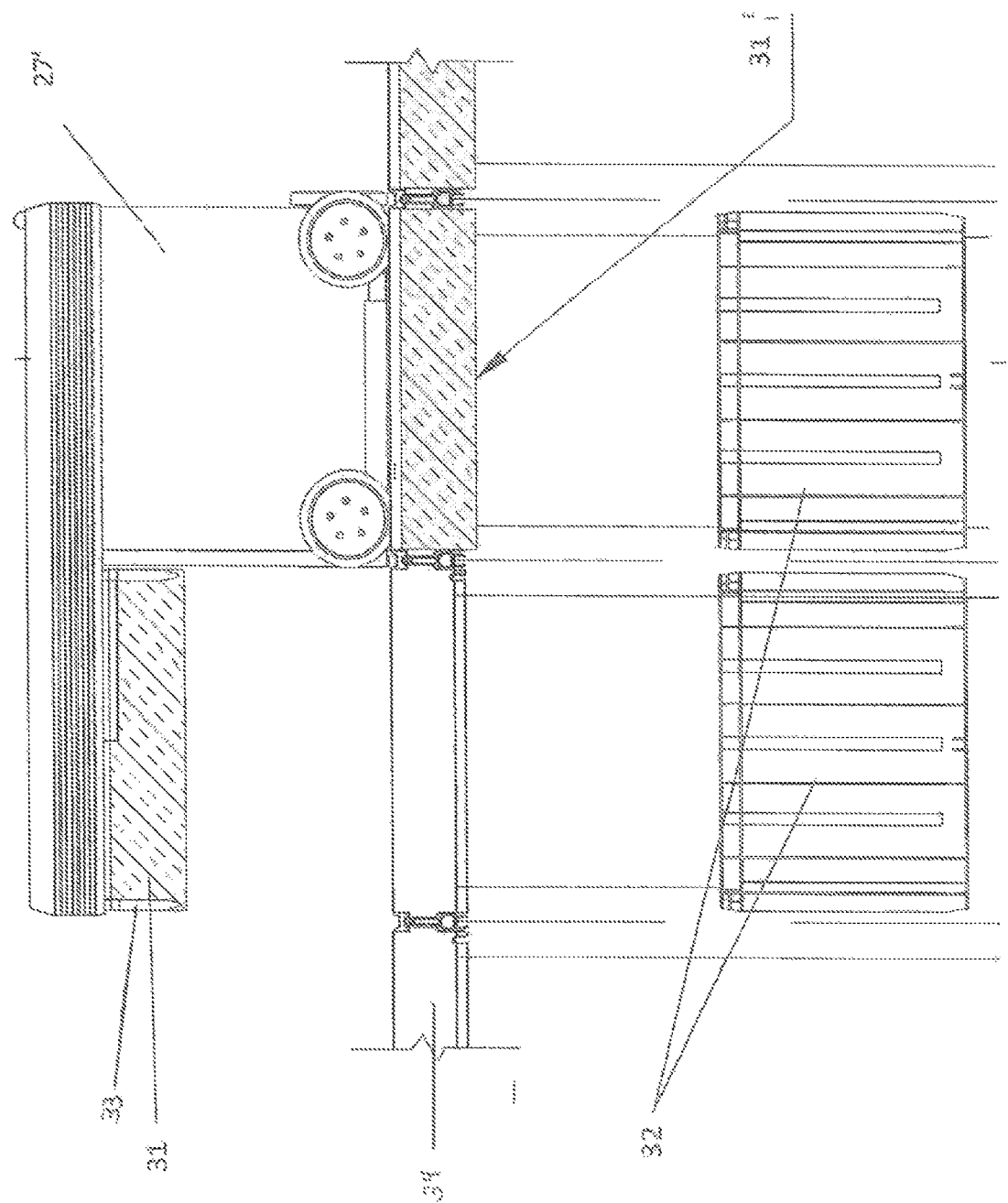

COOLED STORAGE SYSTEM

CROSS REFERENCE TO RELATED APPLICATIONS

This application is a continuation of application U.S. Ser. No. 15/118,495 filed 12 Aug. 2016, which is a National Stage application of PCT/EP2015/053390 filed 18 Feb. 2015.

FIELD OF THE INVENTION

The present invention relates to the technical field of logistics and storage systems.

More specifically the invention relates to a storage system for receiving and storing processed refrigerated and frozen food products waiting to be shipped to the marketplace, which comprises a first grid structure of storage cells, each storage cell being arranged to accommodate a vertical stack of storage bins, the first grid structure having a top level. The system further comprises a first vehicle, arranged to move horizontally at the top level of the first grid structure, and a bin lift device, arranged to convey a bin in a vertical direction between the top level of the grid structure and a delivery station. There is provided thermal insulation between at least a section of the grid structure and the remotely operated vehicle, and said section of the grid structure has a temperature that is lower than the temperature of the remotely operated vehicle. The vehicle is further arranged to receive a storage bin from a storage cell at the top level of the first grid structure and to deliver the storage bin to the bin lift device. Moreover, the bin lift device is arranged to receive a bin from the vehicle at the top level of the first grid structure and to convey the bin to the delivery station.

BACKGROUND

The Applicant's already known AutoStore system is a storage system of the type mentioned in the introduction. The AutoStore system comprising a three dimensional storage grid containing storage bins that are stacked on top of each other to a certain height. The storage grid is constructed as aluminium columns interconnected by top rails. A number of vehicles, or robots, are arranged on the top rails. Each vehicle is equipped with a lift for picking up, carrying, and placing bins that are stored in the storage grid.

Such a storage system of the background art has been illustrated in FIG. 1. The storage system 10 comprises a grid structure 20 of storage cells. Each cell is arranged to accommodate a vertical stack of storage bins 30. The grid structure has a top level.

The storage system 10 further comprises one or more vehicle 40, which is arranged to move at the top level of the grid structure and also arranged to receive a bin from a storage cell at the top level of the grid structure.

The storage system 10 further comprises a bin lift device 50. The bin lift device 50 is arranged to receive a bin from a vehicle 40 at the top level of the first grid structure and to convey the bin down in a vertical direction to a delivery station, or port, 60. The storage system 10 may include a plurality of such lift devices 50 and ports 60, as illustrated. Today's households rely on the availability of foodstuffs that can be purchased in a refrigerated or frozen state. Between the time the food is processed and the time it reaches the marketplace, the processed food may be held in a distributor's warehouse under strictly controlled temperatures. In order to minimize the time between storage and delivery, it is a need for efficient logistic systems which can access and deliver the correct food in a minimum of time.

U.S. Pat. No. 2,165,513 describes a cold storage locker room, where the stored goods are manually retrieved.

US 2012272500 describes a storage for storing sample containers in stacks in a low temperature sample store. The low temperature sample store is equipped with a robot suspended above the storage stack for removing and inserting stacks into the storage.

These cooled storages, however, do not have the possibility of easily retrieving the correct container, and the time between storage and delivery would not be acceptable.

BRIEF SUMMARY OF THE INVENTION

An object of the invention is to provide a cooled storage system, which maintains the advantages of prior art logistic systems while providing storage for cooled products.

The invention has been defined in the patent claims.

In one embodiment of the invention a cooled storage system comprises a grid structure of storage cells, where each cell is arranged to accommodate a vertical stack of storage bins and having a top level, at least one remotely operated vehicle arranged to move at the top level of the grid structure and receive a bin from a storage cell at the top level of the grid structure, where there is provided thermal insulation between at least a section of the grid structure and the remotely operated vehicle, and said section of the grid structure has a temperature that is lower than the temperature of the remotely operated vehicle.

The storage system has in one embodiment a general design as outlined in FIG. 1. The products to be stored are arranged in storage bins, which are arranged in the stacks of the storage system. The remotely operated vehicle is adapted for picking up storage bins from the storage system and comprises in one embodiment a vehicle body comprising a first section for storing vehicle driving means and a second section for receiving any storage bin stored in a stack within the storage system, a vehicle lifting device at least indirectly connected to the vehicle body for lifting the storage bin into the second section, a first set of vehicle rolling means connected to the vehicle body allowing movement of the vehicle along a first direction (X) within the storage system during use and a second set of vehicle rolling means connected to the vehicle body allowing movement of the vehicle along a second direction (Y) in the storage system (3) during use, the second direction (Y) being perpendicular to the first direction (X).

In one embodiment the grid structure with associated vertical stacks of storage bins, is sub-divided into a number of sections, for example two, three or more sections. The sections are separated from each other by thermal insulation such as polystyrene, insulating boards or plates, insulating mats, or other suitable insulating material. The thermal insulation constitutes a wall or thermal barrier between the sections of the grid structure, and gives the opportunity of having different temperature in the different sections of the grid structure. In one embodiment at least one of the sections is connected to a cooling unit, thus providing a cooler temperature in this/these sections.

In one embodiment the cooling unit is an evaporator. An evaporator is in this context a device which is used in an air-conditioning system to allow a compressed cooling chemical to evaporate from liquid to gas while absorbing heat in the process. The cooling chemical can for example be R-22 (Freon) or R-410A, or other suitable chemical.

The cooled storage system can further comprise a bin lift device arranged to receive a bin from a vehicle at the top level of the first grid structure and to convey the bin down in a vertical direction to a delivery station, or port. Here the content of the bin can be collected, or the complete bin may be transported to its destination.

In one embodiment the system comprises insulating covers arranged in the top level of the grid structure. The insulating covers provide a thermal barrier towards the remotely operated vehicle as well as contributing to maintaining the desired temperature in the bins in the grid structure. The insulating covers are arranged to be movable by means of the remotely operated vehicle. The vehicle can move one insulating cover to another cell in the grid, or hold it temporarily while a bin is removed from the stack.

Further possible features, including exemplary aspects, structure and operation of various embodiments, have been described in detail below with reference to the accompanying drawings. In the drawings, like reference numbers indicate identical or functionally similar elements.

BRIEF DESCRIPTION OF THE DRAWINGS

FIG. 4 is a schematic side view of the storage system in FIG. 2;

FIG. 5 is a schematic side view illustrating certain aspects of a remotely operated vehicle;

DETAILED DESCRIPTION

Figure 1:
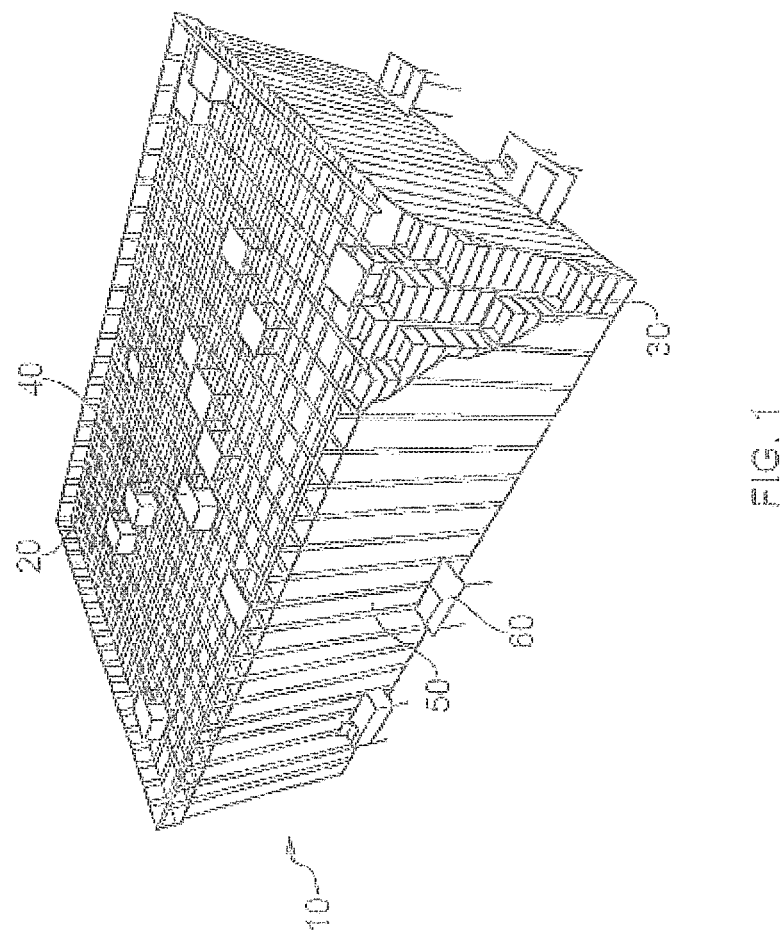
FIG. 1 is a schematic, partly cut perspective view of a storage system according to the background art.

FIG. 1 is a schematic, partly cut perspective view of a storage system according to the background art, which has already been referred to in the background section.

Figure 2:
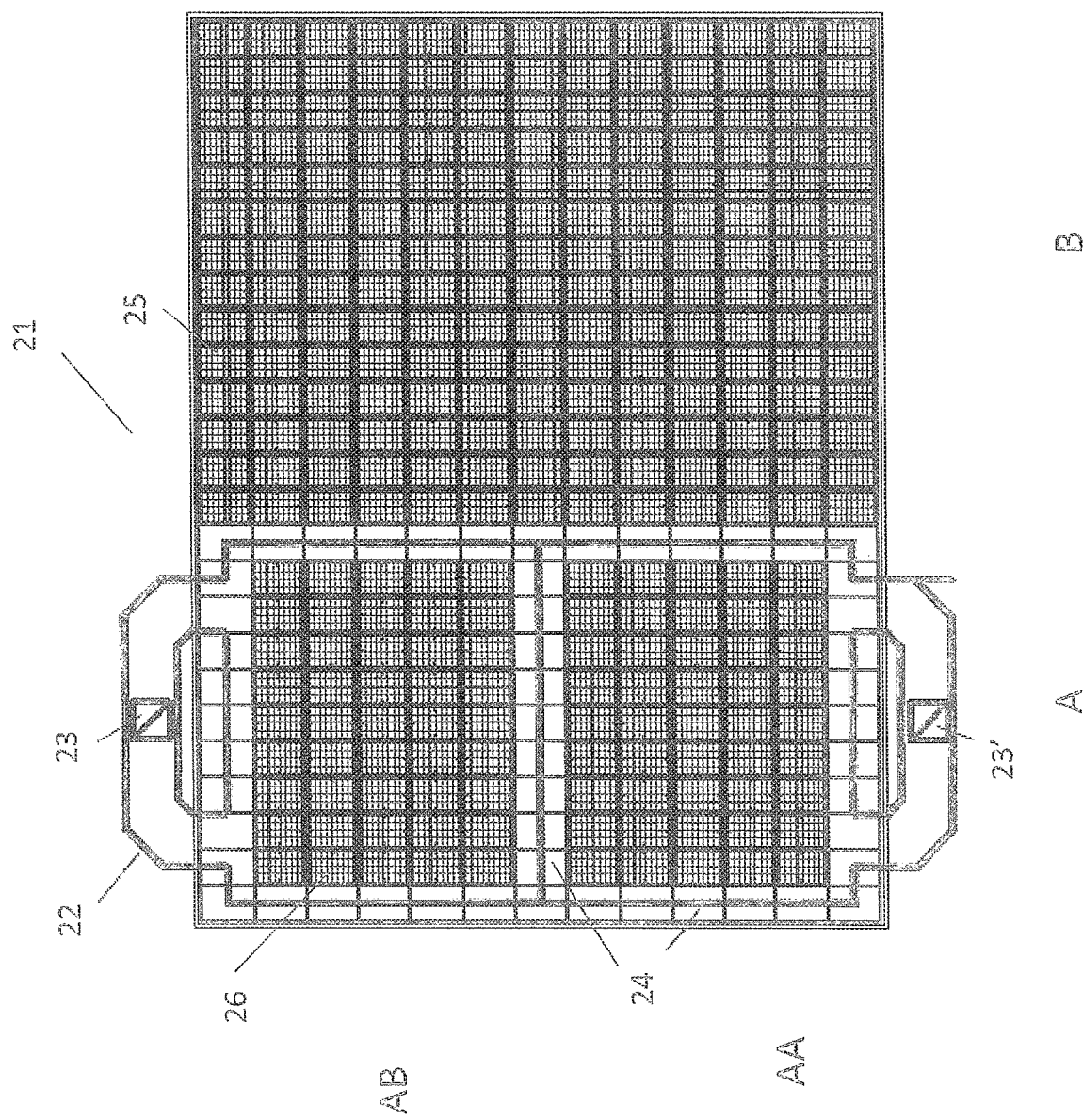
FIG. 2 is a schematic top view illustrating certain aspects of a storage system.
Figure 3:
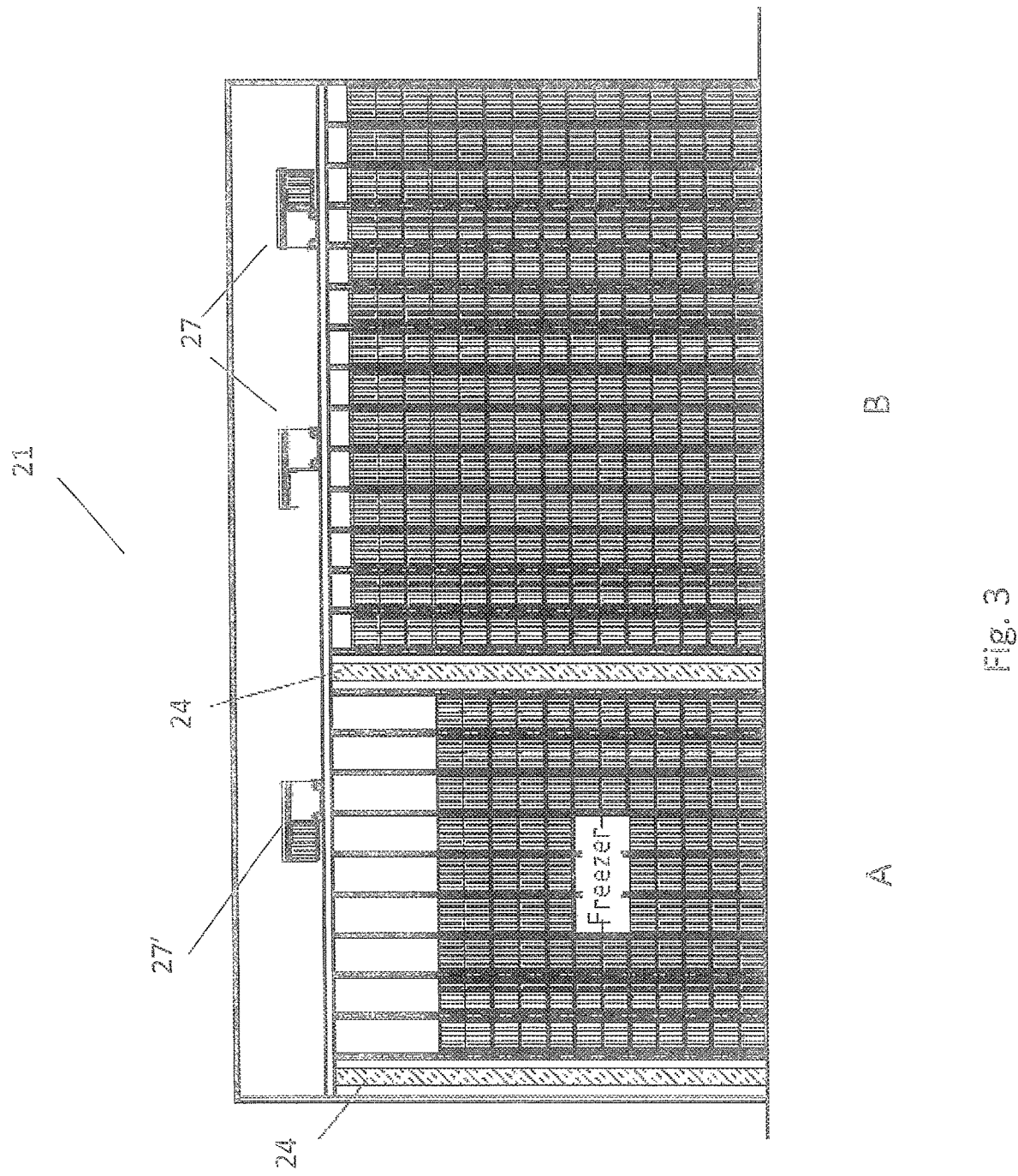
FIG. 3 is a schematic side view of the storage system in FIG. 2.

FIGS. 2, 3 and 4 is a schematic top view and side view illustrating certain aspects of a storage system 21. The storage system 21 includes a grid structure of storage cells 25, 26, where each cell is arranged to accommodate a vertical stack of storage bins and having a top level. At least one remotely operated vehicle 27, 27' having a lifting device 33 is arranged to move at the top level of the grid structure and receive a bin from a storage cell at the top level of the grid structure.

The grid structure is in this embodiment divided into two sections A and B, which are separated by thermal insulation 24. The thermal insulation 24 is arranged in a wall between the two sections. Additionally there is provided thermal insulation between one of the sections, A, and the remotely operated vehicle 27'. The section A can thus have a different temperature than section B and also the remotely operated vehicle.

As seen in FIG. 4, section A is further divided into two sub-sections AA and AB, which also are separated by thermal insulation 24. Both sections AA and AB are connected to a cooling unit 23, such as an evaporator, for lowering the temperature in the storage system sections. In this example, the two sections have different temperature, the temperature of section AA being lower than the temperature of section AB. Section AA may for example have a temperature of 15-20° C. below zero, while section AB may have a temperature of +3-5° C.

The storage system may of course be divided into a different number of sections than is illustrated in this example, having same or different temperatures.

The insulation between the low temperature section A and the remotely operated vehicle means that the vehicle 27' can operate in room temperature in spite of the lower temperature of section A. This is preferable as the performance of the vehicle decreases if the temperature is too low. In particular if the vehicle is battery powered, the operating time of the vehicle is significantly improved in room temperature compared with a cooler temperature.

The vehicles 27, 27', which is arranged to move at the top level of the grid structure, can move freely over the whole top level, ie. over all sections of the grid structure, and also receive a bin from any storage cell at the top level of the grid structure and deliver to a bin lift device as described in FIG. 1.

FIG. 5 is a schematic side view illustrating certain aspects of a remotely operated vehicle arranged at the top level of the grid structure, for example as shown in FIGS. 2-4. The thermal insulation between the low temperature section of the grid structure and the remotely operated vehicle 27' comprises a number of insulated covers 31, arranged at each storage cell at the top level of the grid structure storage cell 32 at the top level of the grid structure.

The remotely operated vehicle 27' is arranged to lift the insulated covers 31 and thus giving access to the storage cell 32 below. The storage bin in the storage cell 32 can then be lifted by another remotely operated vehicle, or the remotely operated vehicle 27' may be arranged to be able to lift both the insulated cover and the storage bin. Alternatively, the remotely operated vehicle 27' moves the insulated cover 31 to a neighboring location 34, and returns to collect the storage bin thus accessible in the storage cell.

After the storage bin 32 has been collected, the vehicle 27 can return the insulated cover to its place, thus ensuring continued insulation of that section of grid structure.

The invention claimed is:

1. A cooled storage system comprising:
a grid structure of storage cells, where each cell is arranged to accommodate a vertical stack of storage bins and having a top level,
a remotely operated vehicle comprising a vehicle body arranged to move at the top level of the grid structure and receive a bin from a storage cell at the top level of the grid structure, where there is provided thermal insulation between at least a section of the grid structure and the remotely operated vehicle, and said section of the grid structure has a temperature that is lower than the temperature of the remotely operated vehicle, the thermal insulation comprising a number of insulated covers arranged at each storage cell at the top level of the grid structure, wherein the grid structure comprises a plurality of columns interconnected by top rails, and that the cooled storage system comprises a plurality of remotely operated vehicles arranged to move on the top rails of the grid structure and receive a bin from a storage cell at the top level of the grid structure, each of the plurality of remotely operated vehicles comprises a first set of wheels connected to the vehicle body allowing movement of the vehicle along a first direction (X) within the storage system during use, a second set of wheels connected to the vehicle body allowing movement of the vehicle along a second direction (Y) in the storage system (3) during use, the second direction (Y) being perpendicular to the first direction (X), a receiving section of the vehicle for receiving a top level storage bin stored in a stack within the storage system and a vehicle lifting device at least indirectly connected to the vehicle body for lifting any of a storage bin and an insulated cover into the receiving section of the vehicle.

2. The cooled storage system according to claim 1, wherein a first remotely operated vehicle is arranged to lift the insulated covers and thus giving access to the storage cell below, while a second remotely operated vehicle is arranged to lift the storage bin in the storage cell.

3. The cooled storage system according to claim 1 or 2, where a first remotely operated vehicle is arranged to lift both the insulated cover and the storage bin.

4. The cooled storage system according to claim 1 or 2, where a first remotely operated vehicle is arranged to move the insulated cover to a neighboring location and to return to collect the storage bin thus accessible in the storage cell.

5. The cooled storage system according to claim 4, where the grid structure is sub-divided into a number of sections, which sections are separated from each other by thermal insulation.

6. The cooled storage system according to claim 5, where at least one of the sections is connected to a cooling unit.

7. The cooled storage system according to claim 6, where the cooling unit is an evaporator.

8. The cooled storage system according to claim 7, where there are at least two sections of grid structure, where the two sections are cooled to different temperatures.

9. The cooled storage system according to claim 1, comprising a bin lift device arranged to receive a bin from a vehicle at the top level of the grid structure and to convey the bin down in a vertical direction to a delivery station, or port.

* * * * *